United States Patent [19]

Ludwig et al.

[11] 3,815,779
[45] June 11, 1974

[54] SAFETY PRESSURE RELIEF DEVICE

[75] Inventors: Gary J. Ludwig; Loren E. Wood, both of Tulsa, Okla.

[73] Assignee: Black, Sivalls & Bryson, Inc., Tulsa, Okla.

[22] Filed: Mar. 17, 1972

[21] Appl. No.: 235,704

[52] U.S. Cl. ............................................ 220/89 A
[51] Int. Cl. ............................................. F17b 1/14
[58] Field of Search ........................ 220/89 A, 89 B

[56] References Cited
UNITED STATES PATENTS

| | | | |
|---|---|---|---|
| 2,663,458 | 12/1953 | MacGlashan | 220/89 A |
| 2,856,096 | 10/1958 | Philip | 220/89 A |
| 2,947,443 | 8/1960 | Sawyer | 220/89 A |
| 3,109,553 | 11/1963 | Fike | 220/89 A |
| 3,612,345 | 10/1971 | Fike | 220/89 A |

Primary Examiner—George E. Lowrance
Attorney, Agent, or Firm—Dunlap, Laney, Hessin, Dougherty & Codding

[57] ABSTRACT

The present invention relates to an improved safety pressure relief device of the type having a rupture disk supported between a pair of annular supporting members adapted to be clamped between a pair of conventional pipe flanges. The rupture disk includes an annular flat flange portion and each of the annular supporting members have annular flat portions to coact with and support the rupture disk. Means are provided attached to the supporting members for aligning the supporting members, centering the rupture disk therebetween and preventing the rupture disk from being installed improperly. One of the supporting members includes an annular spacing member attached to the outside periphery thereof so that when the safety pressure relief device is clamped between conventional pipe flanges, the device is automatically centered therein.

6 Claims, 3 Drawing Figures

PATENTED JUN 11 1974   3,815,779
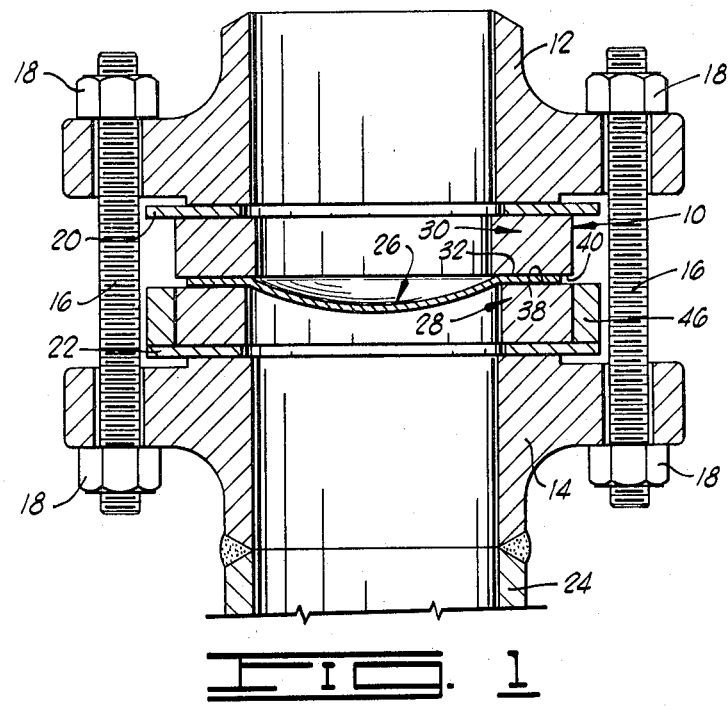
FIG. 1
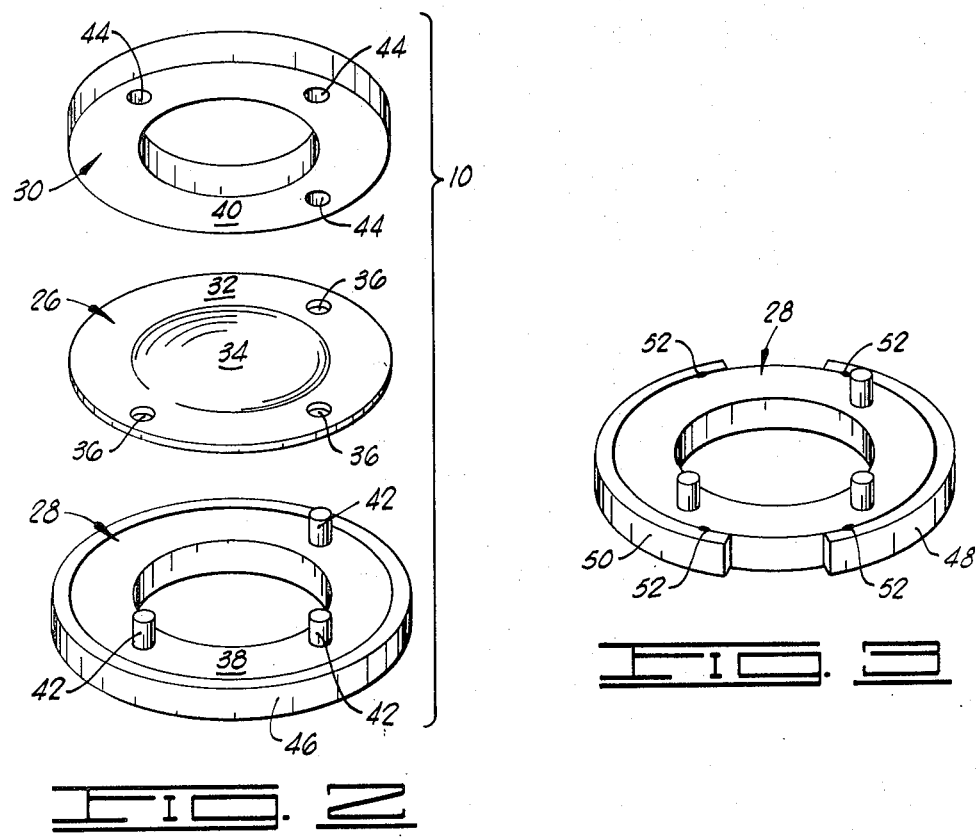
FIG. 2
FIG. 3

SAFETY PRESSURE RELIEF DEVICE

BACKGROUND OF THE INVENTION

1. Field of the Invention

The present invention relates generally to safety pressure relief devices, and more particularly, but not by way of limitation, to an improved safety pressure relief device of the rupturable type adapted to be clamped between conventional pipe flanges.

2. Description of the Prior Art

Many various safety pressure relief devices of the rupture disk type have been developed. Generally these devices include a rupture disk supported between a pair of special flanges which are in turn welded to a relief connection of a pressure vessel or system. When the pressure within the vessel or system exceeds the design rupture pressure of the rupture disk, rupture occurs causing excess fluid pressure to be relieved.

Recently, rupturable safety pressure relief devices have been developed for clamping between conventional pipe flanges. That is, instead of special flanges which are relatively expensive, the safety pressure relief device includes a pair of supporting members adapted to be clamped between conventional pipe flanges. In use of this type of safety pressure relief device, problems have been encountered as a result of misalignment of the rupture disk within the supporting members, misalignment of the supporting members with each other, or improper installation, such as installation of the rupture disk in an upside down position or utilization of an improper rupture disk with the supporting members.

In accordance with one aspect of the present invention, an improved safety pressure relief device of the type which may be installed between conventional pipe flanges is provided wherein misalignment of the rupture disk and/or the supporting members and improper installation of the rupture disk is automatically prevented.

A further problem encountered in the use of safety pressure relief devices mounted between conventional pipe flanges is the misalignment of the entire device within the pipe flanges. As is well understood by those skilled in the art, the distance between opposite bolts or studs of a particular size of flange connection varies in accordance with the pressure rating of the flanges. That is, a 2 inch, 150 pound ASA, raised face flange has a bolt circle of one diameter while a 2 inch, 600 pound ASA, raised face flange has a bolt circle of a slightly larger diameter and a 2 inch, 1,500 pound ASA, raised face flange has yet a larger diameter bolt circle. Thus, a safety pressure relief device of the proper size for clamping between 150 pound ASA flanges is subject to misalignment in flanges of higher pressure rating. In order to insure that safety pressure relief devices mounted between conventional pipe flanges are centered therein, the relief device should have an outside diameter substantially equal to the distance between the flange studs or bolts. In another aspect of the present invention, this is economically accomplished by the provision of supporting members having a design and pressure rating suitable for installation in all available pressure rated pipe flanges of a particular size with means for conveniently adapting the effective outside diameter thereof to the desired diameter.

SUMMARY OF THE INVENTION

The present invention relates to a safety pressure relief device having a rupture disk supported between a pair of annular supporting members adapted to be clamped between a pair of conventional pipe flanges. By the present invention, one of the supporting members includes an annular spacing member attached to the outside periphery thereof, the spacing member being of an outside diameter such that when the safety pressure relief device is clamped between pipe flanges of a particular pressure rating the device is centered therein. In another aspect of the present invention, the rupture disk includes an annular flat flange portion and each of the annular supporting members have annular flat portions to coact and support the rupture disk. Means are provided attached to the supporting members for aligning the supporting members, centering the rupture disk therebetween and preventing the rupture disk from being installed upside down.

It is, therefore, a general object of the present invention to provide an improved safety pressure relief device of the type installed between conventional pipe flanges.

A further object of the present invention is the provision of an improved safety pressure relief device of the type adapted to be clamped between conventional pipe flanges wherein upon assembly of the device the supporting members are automatically aligned, the rupture disk is centered between the supporting members and the rupture disk is prevented from being installed upside down in the supporting members.

Another object of the present invention is the provision of an improved safety pressure relief device of the type adapted to be installed between conventional pipe flanges wherein the possiblity of installing the device in a pressure system utilizing the wrong kind of rupture disk, or with the various parts of the device improperly assembled, is eliminated.

Yet a further object of the present invention is the provision of an improved safety pressure relief device of the type installed between a pair of conventional pipe flanges wherein a single device of a particular size may be readily and economically adapted for installation in pipe flanges of any desired pressure rating with automatic centering of the device therein resulting.

Other and further objects, features and advantages of the present invention will be apparent from the following description of the preferred embodiments, given for the purpose of disclosure and taken in conjunction with the accompanying drawings.

DESCRIPTION OF THE DRAWINGS

FIG. 1 is an elevational view, in cross-section, of the improved safety pressure relief device of the present invention installed between a pair of conventional pipe flanges, FIG. 2 is an exploded perspective view showing the various parts of the improved safety pressure relief device of the present invention, and FIG. 3 is a perspective view of one of the supporting members of the device of the present invention having an alternate form of spacing member attached thereto.

DESCRIPTION OF THE PREFERRED EMBODIMENTS

Referring to the drawings, the specifically to FIG. 1, the safety pressure relief device of the present invention is generally designated by the numeral 10 and is shown clamped between a pair of conventional raised face, weld neck pipe flanges 12 and 14. A plurality of studs 16 and 18 retain the flanges 12 and 14 in clamping engagement with the device 10. Conventional gaskets 20 and 22 are provided between the raised face portions of the flanges 12 and 14 and the device 10. The studs and nuts 16 and 18 are tightened so that the device 10 is rigidly clamped between the flanges 12 and 14 and gaskets 20 and 22 thereby preventing fluids under pressure contained within a conduit 24 connected to the inlet flange 14 and to a pressure vessel or pressure system (not shown) from escaping.

Referring particularly to FIGS. 1 and 2, the device 10 basically comprises a circular rupture disk 26 supported between inlet and outlet supporting members 28 and 30 respectively. While the rupture disk 26 may be any of a variety of designs, a reverse buckling disk of the type described in U.S. Pat. No. 3,484,817 dated Dec. 16, 1969 is particularly suitable for use in accordance with the present invention. The rupture disk 26 illustrated in the drawings is of the reverse buckling type and includes an annular flange portion 32 connected to a concave-convex portion 34. Three apertures 36 are provided in the rupture disk 26 positioned asymmetrically in the annular flange portion 32 thereof.

Each of the supporting members 28 and 30 are provided with annular flat portions 38 and 40 respectively for coacting with the annular flange portion 32 of the rupture disk 26 and supporting the rupture disk 26 therebetween. The inlet supporting member 28 includes three upstanding posts 42 positioned asymmetrically on the annular flat portion 38 thereof. As will be understood, the posts 42 are of a size such that they fit within the apertures 36 of the rupture disk 26 and are positioned so that when the rupture disk 26 is installed on the inlet supporting member 28 with the posts 42 fitted through the apertures 36, the rupture disk 26 is centered on the supporting member 28. Due to the asymmetric positioning of the posts 42 and apertures 36, the rupture disk 26 cannot be installed in an upside down position.

The outlet supporting member 30 includes three bores 44 which are complimentary to the posts 42. That is, the bores 44 are positioned with respect to the posts 42 such that when the device 10 is fitted together with the posts 42 inserted in the bores 44, the inlet and outlet supporting members 28 and 30 are automatically held in proper alignment with respect to each other and with respect to the rupture disk 26.

The posts 42, of course, may vary in number and shape and may be installed on the outlet supporting member 30 with the bores 44 being included in the inlet supporting member 38, or alternatively, one or more of the posts 42 may be installed on one of the supporting members with the remaining posts installed on the other of the supporting members.

Referring still to FIGS. 1 and 2, the inlet supporting member 28 of the device 10 includes an annular spacing member 46 attached to the periphery thereof. As previously described herein, conventional pipe flanges are available in a variety of sizes as well as a variety of pressure ratings. For example, carbon steel flanges are available in ASA pressure ratings of 150, 300, 400, 600, 900, 1,500 and 2,500 psig. The particular pressure rated flange required for containing fluids under pressure depends on the particular pressure and temperature involved, e.g., a 150 pound ASA flange is required for containing fluids under a pressure of 100 psig at a temperature of 100°F and a 600 pound ASA flange is required for containing fluids under a pressure of 1,000 psig at a temperature of 100°F. The bolt circle of a 150 pound ASA flange is generally smaller than that of a 300 pound flange in the same size which is in turn generally smaller than that of a 600 pound ASA flange, and so on.

In order to insure that the device 10 is centered properly between conventional pipe flanges, a spacing member 46 is provided attached to one or both of the supporting members 28 and 30 so that the effective outside diameter of the device 10 corresponds with the distance between the studs 16 as shown in FIG. 1. Thus, referring to FIG. 1, upon assembly of the device 10 and conventional pipe flanges 12 and 14, the device 10 is automatically centered between the flanges 12 and 14 by the studs 16.

In accordance with the present invention, a different spacing member 46 is provided with the device 10 depending upon the particular pressure rating of the flanges in which the device 10 is to be installed instead of providing different devices for each flange pressure rating. Stated another way, a single basic unit is provided for installation in a particular size of flange connection regardless of the pressure rating. In order to adapt the basic unit for installation in a flange connection of particular pressure rating, a spacing member 46 of proper size is either permanently or removably attached to one of the supporting members 28 or 30 so that the effective outside diameter of the device 10 is such that the device 10 is automatically centered within the flange connection by contact with the studs thereof.

As will be readily apparent to those skilled in the art, the spacing member 46 may take a variety of forms. For example, as shown in FIG. 3, a pair of arcuate members 48 and 50 may be provided in lieu of the single spacing member 46 attached to the supporting member 28 by spot welds 52.

ASSEMBLY AND OPERATION OF THE DEVICE 10

Referring to FIGS. 1 and 2, the device 10 is assembled by placing the rupture disk 26 over the upstanding posts 42 of the supporting member 28 so that the posts 42 are fitted through the apertures 36 thereof. The outlet supporting member 30 is then positioned on top of the rupture disk 26 so that the posts 42 are inserted within the bores 44 thereof. A spacing member 46 of a size such that the outside diameter thereof is equal to the distance between opposite studs 16 (FIG. 1) of the particular pressure rating of flange connection in which the device 10 is to be installed is slidably secured on the supporting member 28. The assembled device 10 is next positioned between the flanges 12 and 14 and the gaskets 20 and 22, and the studs and nuts 16 and 18 are installed and tightened to rigidly clamp the device 10 therebetween. Due to the action of the upstanding guide posts 42 of the supporting member 28 with the rupture disk 26 and the supporting member 30, the disk 26 is automatically properly aligned within the supporting members 28 and 30, and the supporting members 28 and 30 are properly aligned with each other. Further, due to the outside diameter of the spacing member 46 being substantially the same as the distance between opposite studs 16 of the flanges 12 and 14, the entire device 10 is automatically centered within the flanges 12 and 14.

As previously described, the inlet flange 14 is connected to a pipe 24 which is in turn connected to a vessel or system containing a fluid under pressure. The pressure within the vessel or system is communicated by way of the pipe 24 and flange 14 to the rupture disk 26. In the event the pressure exerted on the rupture disk 26 exceeds the design pressure thereof, rupture occurs and the pressure is relieved through the device 10 and the flanges 12 and 14 to a relief area.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. In a safety pressure relief device adapted to be clamped between a pair of conventional annular pipe flanges, said pipe flanges including a plurality of bolt members disposed through openings positioned in spaced relationship about the peripheries thereof, the improvement comprising:

said safety pressure relief device including a rupture disk supported between a pair of annular supporting members, said supporting members being adapted to fit between said pipe flanges and the bolt members thereof; and an annular spacing member attached to the outside periphery of one of said supporting members, said spacing member being of a shape such that when said safety pressure relief device is clamped between said pipe flanges and said bolt members, said device is centered therein.

2. The apparatus of claim 1 which is further characterized to include:

said rupture disk having an annular flat flange portion;

each of said annular supporting members having annular flat portions to coact and support the annular flat flange portion of said rupture disk; and means attached to said supporting members for aligning said supporting members, centering said rupture disk therebetween and preventing said rupture disk from being installed upside down in the supporting members.

3. The apparatus of claim 2 wherein the means attached to said supporting members for aligning said supporting members, centering said rupture disk therebetween and preventing said rupture disk from being installed upside down in the supporting members comprises:

the annular flat portion of one of said supporting members including a plurality of upstanding posts positioned thereon;

the annular flat portion of the other of said supporting members including a plurality of bores for receiving and engaging said upstanding posts when said supporting members are clamped together thereby aligning said supporting members; and said rupture disk including a plurality of apertures in the annular flange portion thereof positioned with respect to said upstanding posts so that when said rupture disk is positioned between said supporting members with said upstanding posts fitted through said apertures it is centered therebetween and positioned right side up.

4. The apparatus of claim 3 wherein said rupture disk is a reverse buckling disk having a concave-convex portion attached to said annular flange portion.

5. In a safety pressure relief device adapted to be clamped between conventional pipe flanges, said pipe flanges including a plurality of bolt members disposed through openings positioned in spaced relationship about the peripheries thereof, the improvement which comprises:

said safety pressure relief device including a concave-convex reverse buckling rupture disk having an annular flat flange portion connected to the concave-convex portion thereof;

inlet and outlet supporting members adapted to fit between said pipe flanges and said bolt members, said supporting members having annular flat portions to coact and support said annular flat flange portion of said rupture disk;

means attached to said supporting members for aligning said supporting members and centering said rupture disk therebetween with the convex surface of said rupture disk facing said inlet supporting member; and one of said supporting members including an annular spacing member attached to the outside periphery thereof, said spacing member being of a shape such that when said safety pressure relief device is clamped between said pipe flanges and said bolt members, said device is centered therein.

6. The apparatus of claim 5 wherein the means attached to said supporting members for aligning said supporting members and center in said rupture disk therebetween with the convex surface thereof facing the inlet supporting member comprises:

the annular flat portion of the inlet supporting member including a plurality of upstanding posts positioned thereon;

the annular flat portion of the outlet supporting member including a plurality of complimentary bores for receiving and engaging said upstanding posts when said supporting members are clamped together thereby aligning said supporting members; and said reverse buckling rupture disk including a plurality of apertures in the annular flange portion thereof positioned with respect to said upstanding posts so that when said rupture disk is positioned between said supporting members with said upstanding posts fitted through said apertures it is centered with the convex surface thereof facing said inlet supporting member.

* * * * *